(12) United States Patent
Paetzold et al.

(10) Patent No.: US 6,875,382 B2
(45) Date of Patent: Apr. 5, 2005

(54) PROCESS TO PURGE POLYMER OR PLASTIC MELT GUIDING PARTS OF FILM EXTRUSION SYSTEMS

(75) Inventors: Reinhard Paetzold, Osnabrueck (DE); Ulrich Krause, Lienen (DE)

(73) Assignee: Windmoeller & Hoelscher, Lengerich (DE)

( * ) Notice: Subject to any disclaimer, the term of this patent is extended or adjusted under 35 U.S.C. 154(b) by 444 days.

(21) Appl. No.: 09/954,216

(22) Filed: Sep. 18, 2001

(65) Prior Publication Data

US 2002/0063353 A1 May 30, 2002

(30) Foreign Application Priority Data

Sep. 18, 2000 (DE) .......................................... 100 46 454

(51) Int. Cl.[7] .......................... B29C 33/72; B29C 47/92
(52) U.S. Cl. ..................... 264/39; 264/40.7; 425/145; 425/225
(58) Field of Search .................... 264/39, 40.7; 425/132, 425/130, 133.5, 145, 190, 135, 215, 225

(56) References Cited

U.S. PATENT DOCUMENTS 5,424,012 A * 6/1995 Ertle et al. ..................... 264/39
5,965,624 A * 10/1999 Armstrong et al. ......... 514/772.4
6,060,445 A * 5/2000 Chandraker et al. ......... 510/475
6,294,120 B1 * 9/2001 Negi et al. ............... 264/176.1

FOREIGN PATENT DOCUMENTS

DE          199 31 147          7/2000

* cited by examiner

Primary Examiner—Mark Eashoo
(74) Attorney, Agent, or Firm—Jacobson Holman PLLC

(57) ABSTRACT

A process to purge film extrusion systems with at least one extruder for the purpose of changing batches, wherein the speed is changed periodically in at least that part of the extruder in which the material is changed. By considering the mass flow rate of the film extrusion system, advantageous improvements of the process avoid the situation in which the film tears off. To this end, at least one selected guide extruder is operated at a speed which is increased as compared to the normal operation, and at least one selected downstream extruder is operated at a speed that is decreased as compared to the normal operation.

Also included are control and operating units and extrusion systems to carry out the process, which include, among other things, the elements necessary for an automated program run of the purging program and the optical display of the parameters of the same.

19 Claims, 4 Drawing Sheets

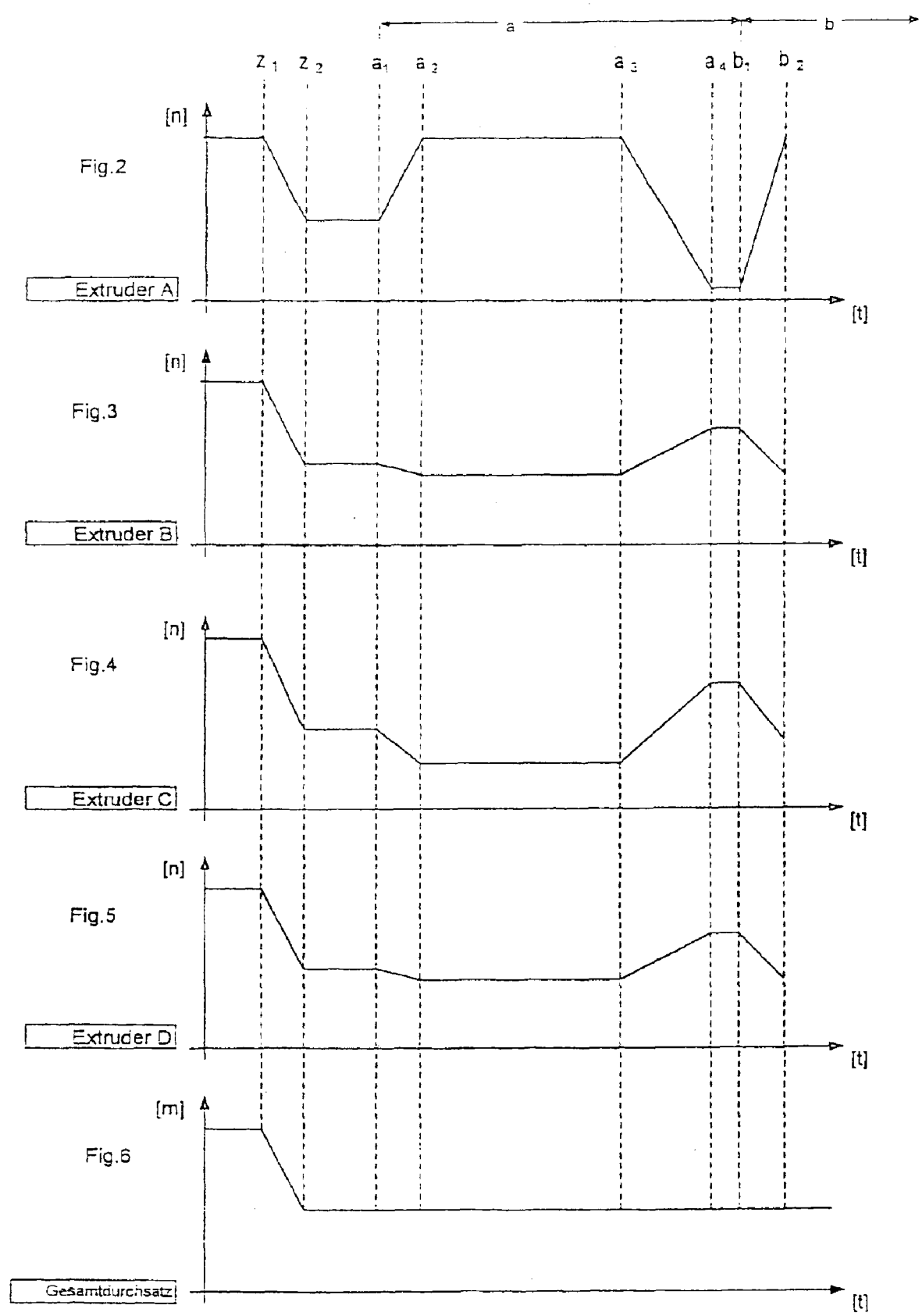

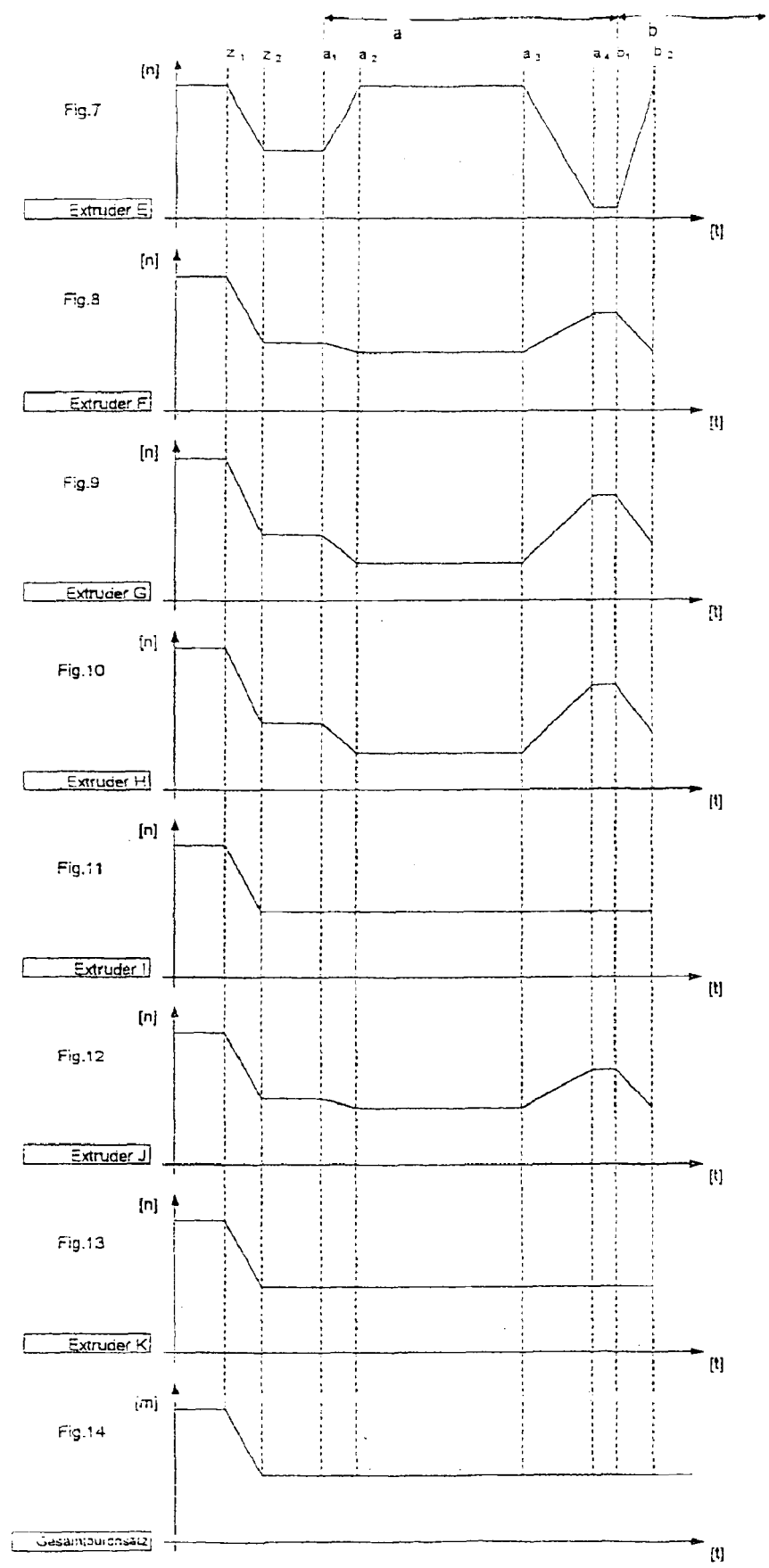

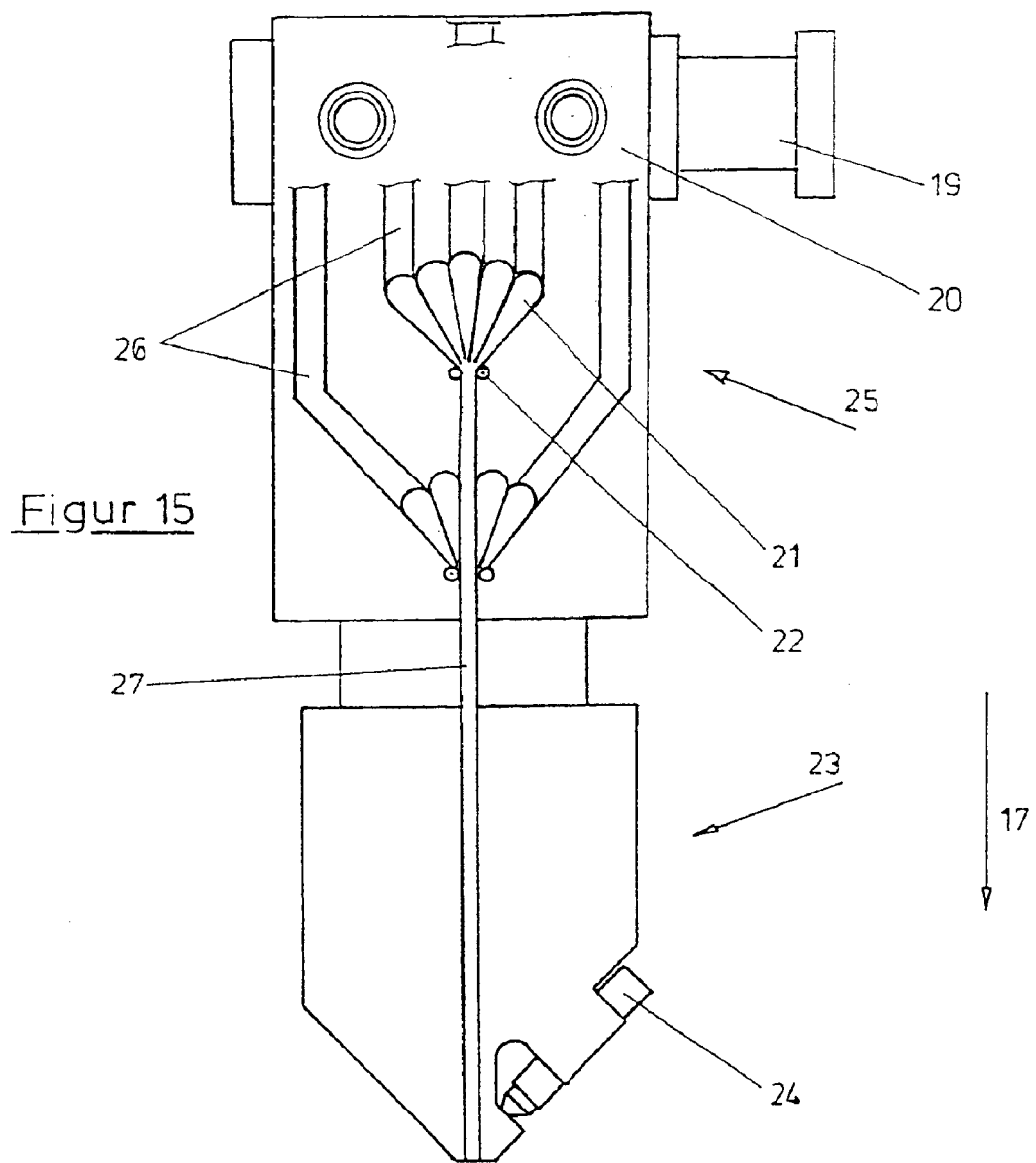

PROCESS TO PURGE POLYMER OR PLASTIC MELT GUIDING PARTS OF FILM EXTRUSION SYSTEMS

BACKGROUND OF THE INVENTION

1. Field of the Invention

The invention relates to a process to purge polymer or plastic melt guiding parts of film extrusion systems with at least one extruder for the purpose of changing batches, control and operating units and film extrusion systems to carry out the process.

2. Description of the Related Art

Film extrusion systems to produce films are known. To produce multilayered films, which are called film composites in the following, film extrusion systems with several extruders are installed.

They are categorized, above all, into film bubble extrusion systems and flat film extrusion systems.

Film bubble extrusion systems are equipped with socalled blown film dies, which eject the film bubbles.

In the case of flat film extrusion systems, which produce film with several layers, a so-called feedblock usually assumes, first of all, the uniting of the different polymer or plastic materials. Then, the resulting plastic composite is extruded by a die and a flat film is produced.

Both types of systems are described in detail with reference to embodiments used for the purpose of examples in the description of the object.

In recent years the need for many different types of films and film composites has increased. Therefore, different film composites are frequently produced one after the other by the same film extrusion system. When changing over from one film composite to the next, it is often necessary to clean the parts of the film extrusion system that guide the polymer or plastic material.

This cleaning can be done by dissecting and cleaning the polymer or plastic guiding parts in large volume cleaning units.

However, owing to the enormous expense associated with such a cleaning process, so-called purging phases are often inserted when changing over from one film composite to the next.

During such a purging phase the plastic residues in a film extrusion system are usually purged with other plastic melts.

In so doing, the material of the following film composite is often used. However, it is also possible to use other material that is economical or has good purging properties.

Such a purging process to change over from one film composite to the next film composite can take a long time, since residual material that can be detached only slowly remains sticking in the film extrusion system.

The present invention proceeds from this point.

SUMMARY OF THE INVENTION

Proposed is a process for purging polymer or plastic melt guiding parts of film extrusion systems with at least one extruder for the purpose of changing batches. Said process can decrease the change-over time.

To this end, the speed is changed periodically in at least one part of the extruders, wherein the material change takes place.

By changing the mass pressure in the individual extruders, the feed lines of the extruders, the spiral grooves in the cylindrical mandrel of the blown film die or the corresponding parts of flat film extrusion systems, the residual material is purged significantly faster out of film extrusion systems. Therefore, besides the shorter change-over periods, smaller quantities of waste or quantities of relatively low quality mix material can be expected. In particular in extruders, in which no material is changed, or in extruders, which are operated with one material that can be purged quite well from the system, it is not absolutely necessary, first of all, to change the speed periodically.

When the speed of different extruders in the film extrusion system is changed periodically, it is expedient to select from the group of extruders, in which the speed is changed periodically, at least one guide extruder (A) and at least one downstream extruder (B, C, D), whose speed pulses, subject to the mass flow rate of the film extrusion system, at an amplitude having an opposite sign, so that a film rupture is avoided.

In this manner the enormous expense induced by feeding the film back into the system again after the film tears is avoided in all film extrusion systems. Thus, for example, after a bubble ruptures in film bubble extrusion systems, which are also often provided with reversing units, the film bubble, which has torn off once, has to be pulled up as far as the reversing unit and properly threaded into the same.

To this end, the mass flow rate can be kept, for example, on the level that was set for the production of the last batch. However, it is usually advantageous if a lower mass flow rate, which still suffices to avoid a film rupture during the purging process, is chosen by coordinating the speed of the different extruders.

In particular, if the capacity of a group of first extruders, wherein the material is not changed, is not necessary to avoid a film rupture during the periodic speed change of the other extruders, then there is no need to change periodically the speed of the former first extruders. Therefore, it is advantageous to operate these first extruders during the purging process at a constant speed, which can also amount to zero.

Another advantageous embodiment of the invention provides that during the purging process the necessary change of the speed of said at least one guide extruder and said at least one downstream extruder is carried out by a central control and operating unit.

The change in the speed of the different extruders can be done manually by a machine operator at the central control or operating unit.

In particular for efficiency reasons, it is, however, advantageous for the central control or operating unit to change automatically the speed.

To this end, when changing the speed, the control or operating unit can start from the minimum speed of said at least one downstream extruder, in order to calculate and subsequently adjust the necessary speed of said at least one guide extruder. Naturally the minimum speed of a downstream extruder can also be zero. If the speed of said at least one downstream extruder is increased again, the control and operating unit can proceed in the same manner from the minimum speed of said at least one guide extruder and adjust the speed of the downstream extruders to the requisite speed to avoid a film rupture.

At this point it should be noted that the terms guide extruder and downstream extruder are introduced for the sake of clarity. The guide and downstream extruders are—as already stated above—two functional groups of extruders, which are combined by choice and in which during the purging process the speed is changed periodically. The number of extruders in such a group can also amount to one. The amplitude of the speed change of the two functional groups usually has a different sign at a point in time. Therefore, the measures and means that are used to determine an advantageous speed of the guide and downstream extruders and the subsequent adjustment of the same, are largely identical. To circumvent a misunderstanding, it must also be emphasized that it is also natural for the speed of the different extruder screws of such a functional group to vary.

It will be clarified in the rest of the specification and in the claims that it is also advantageous, when assembling the functional groups, to assign extruders with large mass flow rate, with inexpensive plastic pellets or with plastic material with good purging properties preferably to one functional group. In the present document it is the group of guide extruders.

The speed change of the guide and downstream extruders can also be determined as a rule from the speed that results in the maximum mass pressure in one or several guide extruders. Therefore, a process is just as meaningful, wherein, when changing the speed, the central control or operating unit proceeds from the maximum speed, which said at least one guide extruder exhibits when it reaches its maximum mass pressure, in order to calculate and subsequently adjust the necessary speed of said at least one downstream extruder. Inversely, when changing the speed of the guide extruders, the maximum mass pressure in the downstream extruders can also be determined and considered in the same manner.

When one of the two aforementioned methods is used, the goal is to avoid a film rupture, which can occur if the material flow rate of the film extrusion system drops too much, a state that will result, among other things, in a rejection of very thin walled film. In this case the central control and operating unit must also consider the minimum material flow rate of the film extrusion system that will avoid a film rupture. To accelerate the purging process, extruders with a large material flow rate can be selected preferably as the guide extruders.

To design the purging process as efficiently as possible, said at least one guide extruder can be charged with a material having good purging properties during the purging process. The material used in the guide extruders should generally exhibit a lower price than that used in the downstream extruders.

The control and operating units to carry out the aforementioned processes can include different means that permit a purging process to be carried out in accordance with an automatic program run.

To this end, a control and operating unit, which obtains the means to enter or determine the minimum speed or the maximum speed of the one functional group from extruders of a functional group, can be equipped with other means to determine automatically the necessary speed of the respective other functional group. Thus, the input can take place, for example, with a terminal, whereas a computer can assume automatically the task of finding the necessary speed.

An especially advantageous control and operating unit has means to adjust, display optically or monitor at least one operating parameter of a purging process. In this manner, for example, graphs, on which the speed or the mass flow rate of the extruders can be plotted over time, can be presented on screens, displays or the like, which are connected in an appropriate manner to the control and operating unit.

Such a measure improves significantly the graphic quality of the adjusted operating state of the extruder. It can be left to the discretion of the machine operator whether he will intervene in a specified program run or whether he will wait until the end of the program.

The film, produced during the purging process, is either fed to waste management or sold at a relatively low price. Film, produced during the purging process of the invention, is characterized, upon close inspection, by a periodic change in the thickness of the individual layers of the film composite.

BRIEF DESCRIPTION OF THE DRAWINGS

Other features and advantages of the invention are disclosed in the other claims and the subsequent description in conjunction with the drawings, depicting the embodiments of the invention as a schematic drawing.

FIG. 2 depicts a curve of the speed plotted over time with respect to extruder A during a first exemplary purging process in an extrusion system with four extruders.

FIG. 3 depicts a curve of the speed plotted over time with respect to extruder B during a first exemplary purging process in an extrusion system with four extruders.

FIG. 4 depicts a curve of the speed plotted over time with respect to extruder C during a first exemplary purging process in an extrusion system with four extruders.

FIG. 5 depicts a curve of the speed plotted over time with respect to extruder D during a first exemplary purging process in an extrusion system with four extruders.

FIG. 6 depicts a curve of the total material throughput plotted over time with respect to the extrusion system during a first exemplary purging process in an extrusion system with four extruders.

FIG. 7 depicts a curve of the speed plotted over time with respect to extruder E during a second exemplary purging process in an extrusion system with seven extruders.

FIG. 8 depicts a curve of the speed plotted over time with respect to extruder F during a second exemplary purging process in an extrusion system with seven extruders.

FIG. 9 depicts a curve of the speed plotted over time with respect to extruder G during a second exemplary purging process in an extrusion system with seven extruders.

FIG. 10 depicts a curve of the speed plotted over time with respect to extruder H during a second exemplary purging process in an extrusion system with seven extruders.

FIG. 11 depicts a curve of the speed plotted over time with respect to extruder I during a second exemplary purging process in an extrusion system with seven extruders.

FIG. 12 depicts a curve of the speed plotted over time with respect to extruder J during a second exemplary purging process in an extrusion system with seven extruders.

FIG. 13 depicts a curve of the speed plotted over time with respect to extruder K during a second exemplary purging process in an extrusion system with seven extruders.

FIG. 14 depicts a curve of the total material throughput plotted over time with respect to the extrusion system during a second exemplary purging process in an extrusion system with seven extruders.

FIG. 15 depicts a cross section of a feedblock and a wide die of an exemplary flat film extrusion system.

FIG. 16 depicts a cross section of a film composite comprising several plastic layers.

DETAILED DESCRIPTION OF THE PREFERRED EMBODIMENTS

Figure 1:
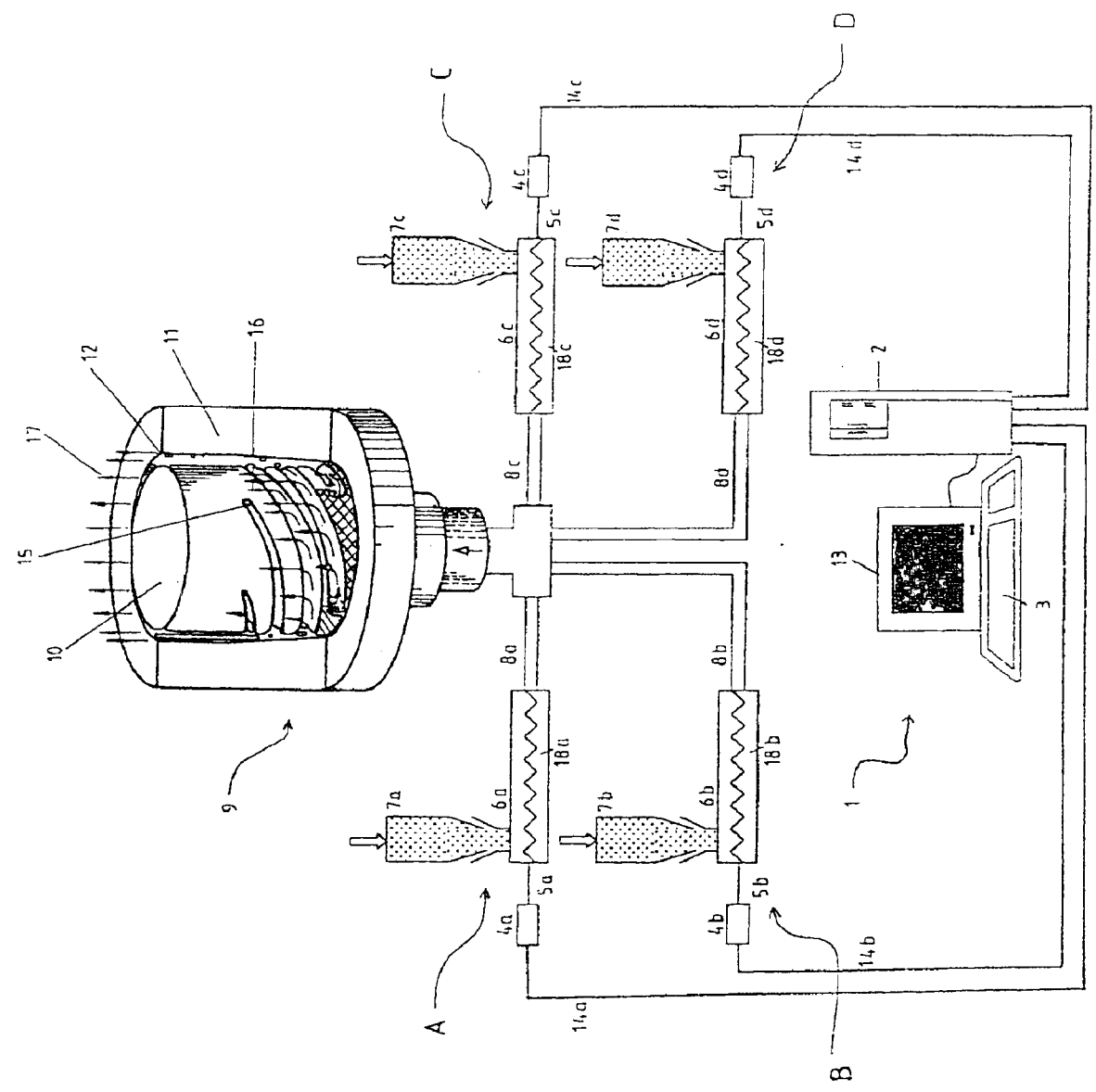
FIG. 1 is a diagrammatic sketch of a film bubble extrusion system with a central control and operating unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 is a diagrammatic sketch of a film bubble extrusion system with a control and operating unit 1. In this embodiment it comprises a computer 2, which includes at least one CPU (not illustrated) and a main memory, which is also not shown, as well as a screen 13 and a keyboard 3.

The control and operating unit 1 is connected by means of signal lines 14a, 14b, 14c and 14d to the drive units 4a, 4b, 4c and 4d, which drive by way of the shafts 5a, 5b, 5c, 5d the extruder screws 18a, 18b, 18c, 18d, which are illustrated by means of a jagged line, into the extruder housings 6a, 6b, 6c, 6d. In this manner the control and operating unit is in a position to control the speed of the extruders A, B, C, D.

Furthermore, the extruders A, B, C, D control the feed hoppers 7a, 7b, 7c, 7d, which provide the extruders with the pellets, illustrated as dots. The pellets are melted in the extruder housings 6a, 6b, 6c, 6d and are fed as the liquefied plastic material, which is under significant mass pressure, to the blown film die 9 by way of feed lines 8a, 8b, 8c, 8d.

The jacket 11 of the blown film die 9 is depicted as a sectional view in the diagrammatic sketch. This manner of presentation opens the view to the cylindrical mandrel 10 of the blown film die, which is enclosed concentrically by the jacket 11. Helical grooves 15, which guide the liquefied plastic material in the direction of the arrows 16, are cut into the outer periphery of the mandrel 10.

In the top area of the mandrel 10 run the helical grooves 15 and feed the plastic material in the direction, drawn by the curved arrows 16, into the slit 12, which widens in the processing direction, between the mandrel 10 and the jacket 11. Over the rest of the course (not illustrated) of the process, whose direction is shown by the straight arrows 17, the plastic material flows first into the die slit, then leaves the blown film die, begins to solidify and finally forms a film bubble, which is passed on for further direct processing or wound up.

FIGS. 2 to 5 show graphs, where the speed of the extruders A, B, C, D is plotted over the time that a process of the invention is being carried out.

At the start of time $z_1$, the production of a specific first film composite has already been running a long time. At time $z_1$ the purging process starts in the illustrated embodiment with the following measures.

The speed of all of the extruders involved is decreased until the total mass throughput reaches at time $z_2$ a low level, which avoids, however, a bubble rupture (FIG. 6). The total mass throughput is held at this level during the purging process.

At time $a_1$ the first cleaning phase a starts.

In this embodiment the efficient extruder A, which is operated with economical material having good purging properties, has been selected as the sole guide extruder. As shown in FIG. 2, in the guide extruder A the speed is first increased between the timespan $a_1$ and $a_4$ in order to hold said speed constant at the high level until the time $a_3$. Between $a_3$ and $a_4$ the speed of the extruder A is significantly reduced, in order to reach at time $a_4$ a low level, which is held constant until time $b_1$.

The extruders B, C, and D were selected as the downstream extruders, where first the speed n is decreased between $a_1$ and $a_2$, as shown in FIGS. 2 to 5. In the ensuing period the speed of the three downstream extruders B, C, D is held constant until the time $a_3$. At the time $a_3$ the speed of the downstream extruders is increased again in order to reach a high level at the time $a_4$, which is held until the time $b_1$. The embodiment, depicted in FIGS. 2 to 5, also shows that the speed and also the speed curves do not have to be identical within the group of the downstream extruders B, C, D. In the case of more than one guide extruder, the same applies to within the group of the guide extruders. In the illustrated example, the speed of the extruders A, B, C, D is coordinated in such a manner that the total mass throughput of the film extrusion system is decreased at the start of the purging process at time $z_1$ and then held constant at the low level starting from time $z_2$. This procedure is depicted in FIG. 6. The mass flow rate, shown there, is the sum of the flow rate of the extruders A, B, C, D of the film extrusion system.

Another special feature of the illustrated embodiment is the short length of the timespan between $a_4$ and $b_1$, as compared to the timespan between $a_2$ and $a_3$. The relative length of these two timespans was dimensioned in the illustrated manner, because the guide extruder A is filled with an economical material having good purging properties.

At time $b_1$ a new cleaning phase begins. To this end, the speed of the guide extruder A is again significantly increased, whereas the speed of the downstream extruders is decreased. Different purging phases may vary in amplitude and phase duration. Instead of the illustrated jagged shape of the speed curve plotted over time for the individual extruders, a rounded sinusoidal curve can also be chosen.

Another very similar embodiment is depicted in FIGS. 7 to 14. Here, too, only the extruder E has been selected as the guide extruder. In many cases, however, it is necessary to define a group comprising several guide extruders. In the second embodiment the speed profile, which is shown in FIG. 7 and belongs to the guide extruder E, and the speed profiles, which are depicted in FIGS. 8 to 10 and 12 and belong to the downstream extruders F, G, H and J, exhibit a shape that is similar to that of the speed profiles of the guide extruder A and the downstream extruders B, C, D of the first embodiment. FIGS. 11 and 13 show the speed profiles of the extruders J and K, wherein no material is changed and whose maximum mass flow rate is required only for a small quantity, in order to guarantee during the purging phase a mass flow rate of the entire film extrusion system that avoids a bubble rupture. To save material, the speed and thus the mass flow rate of the extruders J and K is decreased starting from the time $z_1$. Starting from the time $z_2$, a constant low level is held.

FIG. 14 shows the mass flow rate of the extrusion system of the second embodiment. It runs analogously to the mass flow rate of the first embodiment, depicted in FIG. 6.

Of course, the two aforementioned embodiments, which belong to the process of the invention and are shown by means of the graphs in FIGS. 2 to 6 or 7 to 14, can be carried out to purge all types of film extrusion systems.

FIG. 15 is a cross sectional view of a feedblock 25 and a wide die of an exemplary flat film extrusion system. The polymer or plastic material comes from the extruders (not illustrated) and runs through the feed lines, which are also not illustrated. The polymer or plastic material is then fed through the extruder attachments 20, of which only two are shown here, to the feedblock 25. Inside the feedblock 25 the layer manifold bolt assumes the distribution of the various polymer or plastic materials to the various material channels 26.

In the illustrated embodiment the fine adjustment of the film layer thickness can be done with the adjustable paddle 21 and the manifold pin 22. After the different film layers have been united into a film composite 27, the film composite flows in the processing direction, indicated by the straight arrow 17, into the wide slit die 23. The width of the slit of the wide slit die 23 can be adjusted or regulated with the automatic expansion bolt.

All of the aforementioned parts that belong to the described flat film extrusion system and guide the polymer or plastic melt can be purged with the process, according to the invention.

FIG. 16 is a cross sectional view of a film composite 27 comprising different plastic layers 28. Said film composite is produced during the normal operation of the film extrusion system. For reasons relating to a better overview, a cross section of the film, shown in a purging process according to the invention, is not shown. The cross section of such a film exhibits the periodic changes in the different film layers 28.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A process for purging polymer or plastic melt guiding parts of a film extrusion system to chance a material, comprising the steps of:
    assigning two functional groups to at least one part of the film extrusion system in which the material is changed, a first functional group including at least one guide extruder and a second functional group including at least one downstream extruder; and
    changing a speed in said at least one part of said extrusion system in which the material is changed, including pulsing the speed of said at least one guide extruder and the speed of said at least one downstream extruder, subject to a mass flow rate of the film extrusion system, at an amplitude having an opposite sign so that a film rupture is avoided.

2. The process as set forth in claim 1, wherein a lower mass flow rate of the film extrusion system is set by coordinating the speed of said extruders.

3. The process as set forth in claim 1, wherein said film extrusion system includes at least a further extruder in which a material is not changed, said further extruder being operated at a constant speed during the purging process.

4. The process as set forth in claim 1, further comprising successive cleaning phases in a following sequence:
    continuously increasing the speed of said at least one guide extruder at a start of a cleaning phase at a first time while the speed of said at least one downstream extruder is continuously decreased;
    upon reaching a second time, holding the speed of said at least one guide extruder and the speed of said at least one downstream extruder constant over a first timespan;
    upon reaching a third time, continuously decreasing the speed of said at least one guide extruder while the speed of said at least one downstream extruder is continously increased; and
    upon reaching a fourth time, holding the speed of said at least one guide extruder and the speed of said at least one downstream extruder constant over a second timespan.

5. The process as set forth in claim 4, wherein the first time span is greater than the second time span.

6. The process as set forth in claim 4, wherein the changes in speed of said at least one guide extruder and of said at least one downstream extruder are controlled using a central control and operating unit.

7. The process as set forth in claim 6, wherein said changes in speed are adjusted manually by a machine operator at the central control and operating unit.

8. The process as set forth in claim 6, wherein said changes in speed are adjusted automatically by the central control and operating unit.

9. The process as set forth in claim 6, wherein, when changing the speeds, the central control and operating unit starts from a minimum speed of said at least one guide extruder and subsequently adjusts the speed of said at least one downstream extruder based on said minimum speed.

10. The process as set forth in claim 6, wherein, when changing the speeds, the central control and operating unit starts from a maximum speed which said at least one guide extruder exhibits upon reaching maximum mass pressure and subsequently adjusts the speed of said at least one downstream extruder based on said maximum speed.

11. The process as set forth in claim 1, wherein said at least one guide extruder has a large material flow rate.

12. The process as set forth in claim 1, wherein said at least one guide extruder is filled with a material having good purging properties during the purging process.

13. The process as set forth in claim 1, wherein said at least one guide extruder is filled with an economical material during the purging process.

14. A process for purging polymer or plastic melt guiding parts of a film extrusion system to change a material, said film extrusion system having at least one guide extruder and at least one downstream extruder, comprising the steps of:
    continuously increasing the speed of said at least one guide extruder at a start of a cleaning phase at a first time while the speed of said at least one downstream extruder is continuously decreased;
    upon reaching a second time, holding the speed of said at least one guide extruder and the speed of said at least one downstream extruder constant over a first timespan;
    upon reaching a third time, continuously decreasing the speed of said at least one guide extruder while the speed of said at least one downstream extruder is continously increased; and
    upon reaching a fourth time, holding the speed of said at least one guide extruder and the speed of said at least one downstream extruder constant over a second timespan.

15. The process as set forth in claim 14, wherein said film extrusion system includes at least a second extruder in which a material is not changed, said second extruder being operated at a constant speed during the purging process.

16. The process as set forth in claim 14, wherein the changes in speed of said at least one guide extruder and of said at least one downstream extruder are controlled using a central control and operating unit.

17. The process as set forth in claim 16, wherein, when changing the speeds, the central control and operating unit starts from a minimum speed of said at least one guide extruder and subsequently adjusts the speed of said at least one downstream extruder based on said minimum speed.

18. The process as set forth in claim 16, wherein, when changing the speeds, the central control and operating unit starts from a maximum speed which said at least one guide extruder exhibits upon reaching maximum mass pressure and subsequently adjusts the speed of said at least one downstream extruder based on said maximum speed.

19. The process as set forth in claim 14, wherein the first time span is greater than the second time span.

* * * * *